United States Patent [19]

Tomita et al.

[11] 4,095,085
[45] June 13, 1978

[54] HIGH EFFICIENCY ARC WELDING PROCESS AND APPARATUS

[75] Inventors: Makoto Tomita, Yokohama; Hisaaki Yokota, Chigasaki; Syozi Koga, Kamakura; Toshisada Kashimura, Tokyo, all of Japan

[73] Assignee: Kobe Steel, Limited, Kobe, Japan

[21] Appl. No.: 727,705

[22] Filed: Sep. 29, 1976

[30] Foreign Application Priority Data

Sep. 29, 1975 Japan ............................... 50-118078
Sep. 29, 1975 Japan ............................... 50-118076

[51] Int. Cl.$^2$ .............................................. B23K 9/08
[52] U.S. Cl. ................................ 219/123; 219/125.12
[58] Field of Search .................. 219/123, 124, 125 R, 219/125 PL, 137 R, 131 F

[56] References Cited

U.S. PATENT DOCUMENTS

| 2,844,705 | 7/1958 | Bowman et al. ..................... 219/123 |
| 2,920,183 | 1/1960 | Greene ............................ 219/137 R |
| 3,825,712 | 7/1974 | Gibbs ................................. 219/123 |
| 3,941,974 | 3/1976 | Kano et al. ........................ 219/123 |
| 3,956,610 | 5/1976 | Kanabe et al. ................... 219/131 F |
| 4,017,709 | 4/1977 | Watanabe et al. ................... 219/123 |

FOREIGN PATENT DOCUMENTS 48-42948  6/1973  Japan ............................... 219/125 R Primary Examiner—J. V. Truhe
Assistant Examiner—Clifford C. Shaw
Attorney, Agent, or Firm—Oblon, Fisher, Spivak, McClelland & Maier

[57] ABSTRACT

A high efficiency arc welding process and apparatus wherein an arc is generated between an electrode and plates to be welded, the welding electrode is oscillated, and the direction of the arc is oscillated by a magnetic force in synchronism with the oscillation of the welding electrode so that the arc is directed to the groove face of each plate to be welded.

18 Claims, 14 Drawing Figures

HIGH EFFICIENCY ARC WELDING PROCESS AND APPARATUS

BACKGROUND OF THE INVENTION

1. Field of the Invention

The present invention relates to a high efficiency welding process and apparatus wherein a welding electrode and arc are both oscillated.

2. Description of the Prior Art

Heretofore, in order to improve the efficiency of metal arc welding, the amount of the deposited metal formed by one welding pass has been increased by increasing the welding current. Since the welding current cannot be greatly increased in the horizontal or the vertical welding position, oscillation of the welding electrode has been adopted to perform horizontal or vertical welding as the easiest and the most practical method to increase the amount of deposited metal. For example U.S. Pat. No. 3,832,522 discloses a vertical upward welding process and apparatus wherein the welding electrode is oscillated across the welding line.

As a result of the increasing demand for the welding of thick metal plates, a narrow gap groove joint has recently been substituted for the X—groove joint in view of the necessary amount of the deposited metal. However, with mere oscillation of the welding electrode, the groove faces at the both sides of the narrow gap groove are not penetrated enough, because the welding arc is weak in the direction of the groove face. Thus the defects such as lack of fusion may occur and a sound weld cannot consistently be obtained. Especially in the case of thick plates of aluminum or aluminum alloy sufficient penetration to the groove face cannot be obtained.

U.S. Pat No. 3,328,556 discloses a welding process wherein the welding arc is generated between a non-consumable electrode and the thick plates to be welded, filler wire is fed to the narrow gap, and the non-consumable electrode is oscillated across the welding line.

It is known to direct a welding arc towards a predetermined position within the welding groove. For example, German lay open print DT-OS 2,325,708 (corresponding to U.S. Pat. No. 3,941,974) discloses an arc welding process wherein a welding electrode is placed within the welding groove in a flat welding position so that the electrode is electrically insulated from the plates to be welded, and the arc between the electrode and the plates to be welded is directed towards the predetermined position of the welding groove by a magnetic force.

However, these conventional processes do not teach how to perform high efficiency welding of a narrow gap horizontal or vertical welding groove formed between thick metal plates how to be welded and to obtain sufficient penetration to the groove faces of the narrow groove. Accordingly, there is a need for a high efficiency welding process and apparatus to produce the above mentioned results.

SUMMARY OF THE INVENTION

Accordingly, one object of this invention is to provide a high efficiency arc welding process and apparatus.

Another object of this invention is to provide a high efficiency arc welding process and apparatus for obtaining a sound weld free from defects in the case of welding a narrow gap groove joint between thick aluminum or aluminum alloy plates.

Briefly, these and other objects of the present invention are achieved by a high efficiency arc welding process and apparatus in which the arc direction is controlled in synchronism with oscillation of the welding electrode, so that the arc may be directed towards the groove face while the electrode travels along the groove face. When the welding arc is directed towards the desired position of the groove, a magnetic field is generated across the welding arc. More specifically, a pair of magnetic heads are provided on both sides of the electrode so that a magnetic field is generated along the weld joint line. The angle of the arc can be determined by adjusting the strength of the magnetic force, and the sense of the arc can be determined by the polarity of the magnetic heads. Accordingly, the direction of the arc can be magnetically controlled so that a narrow gap can easily be welded. When the electrode is oscillated within a welding groove between thick plates, an increased amount of deposited metal can be obtained with one welding pass, resulting in a corresponding improvement in welding efficiency. Particularly, according to the invention vertical or horizontal arc welding can be most efficiently and easily conducted compared with conventional welding.

The present invention can be applied to MIG welding using a consumable electrode and to TIG welding using a non-consumable electrode, and particularly to welding wherein the electrode is oscillated and travels along the groove face of the welding joint. The present invention is characterized in that the arc generated between the oscillated electrode and the plates to be welded is directed towards the groove face, resulting in deep penetration to the groove face. Furthermore, high efficiency welding of a narrow gap is made possible in all position welding by adopting the present invention.

BRIEF DESCRIPTION OF THE DRAWINGS

FIG. 2(a) shows triangular oscillation, FIG. 2(b) shows rectangular oscillation, FIG. 2(c) shows reciprocating movement in the plate thickwise direction. FIG. 2(d) shows reciprocating movement in the groove widthwise direction, FIG. 2(e) shows "U" shaped oscillation, and FIG. 2(f) shows reciprocating movement along the joint line.

DETAILED DESCRIPTION OF THE PREFERRED EMBODIMENTS

Figure 1A:
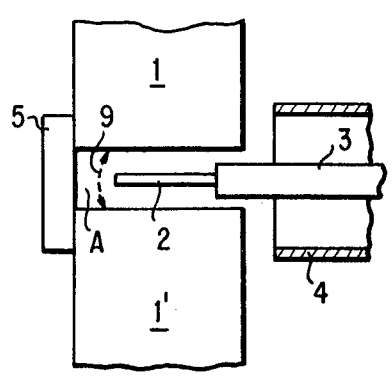
FIG. 1(a) is a longitudinal cross-section of the horizontal arc welding according to the present invention.
Figure 1B:
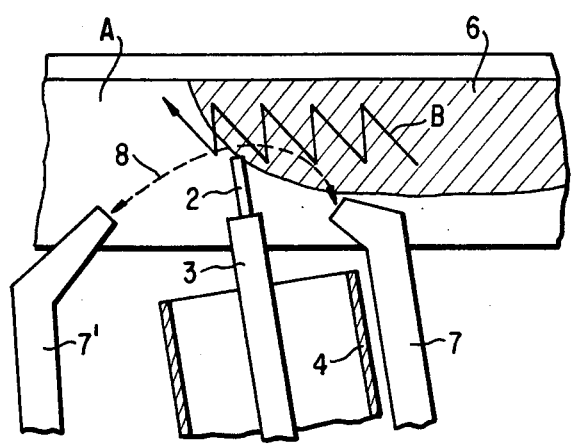
FIG. 1(b) is a transverse cross-section of the horizontal arc welding according to the present invention.
Figure 2A:
FIG. 2(a)–(f) show various types of oscillation patterns of the welding electrode.
Figure 2B:
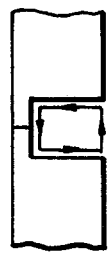
Figure 2C:
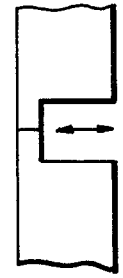
Figure 2D:
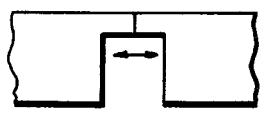
Figure 2E:
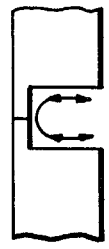
Figure 2F:
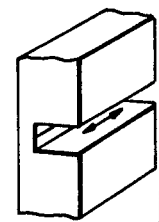

Referring now to the drawings, wherein like reference numerals designate identical or corresponding parts throughout the several views, and more particularly to FIG. 1 thereof, FIG. 1(a) and FIG. 1(b) show the horizontal arc welding arrangement according to the present invention. 1, 1' represent thick plates to be welded, having a thickness preferably of 50 mm and a narrow gap A formed therebetween. A consumable electrode 2 is fed through a welding current feed tip 3. Backing material 5 is placed at the back side of the narrow welding groove. FIG. 1(b) is a plan cross-section of the horizontal arc welding arrangement shown in FIG. 1(a). B represents the locus of the end of the welding electrode. Magnetic heads 7, 7' are provided along the welding line to generate a magnetic field 8 so that the welding arc may be directed in the direction 9, that is, up or down. shielding gas is fed to the welding zone through a shielding nozzle 4. 6 represents weld metal.

The manner of directing the welding are synchronously with the oscillation of the electrode, in the case of horizontal arc welding will now be described. While the electrode advances towards the bottom of the groove, since the length of arc is relatively short, the arc is preferably directed towards the upper groove face so as to obtain deep penetration of the upper groove face. However, if the welding arc is directed towards the lower groove face while the electrode advances to the bottom of the groove, most of the molten metal will deposit on the lower groove face resulting in undercuts on the upper grooves face. On the other hand, while the electrode advances towards the groove surface, the length of arc is relatively long, and the molten metal is distant from the electrode, so that the arc is preferably directed towards the lower groove face so as to obtain deep penetration to the lower groove face, and to fill the groove space with the deposited metal. However, if the arc is directed towards the upper groove face, while the electrode advances towards the groove surface deep penetration to the upper groove face is obtained, the groove space cannot fill with the deposited metal, and undercuts are apt to occur at the upper side of the groove. Accordingly, in the case where the electrode is reciprocatably oscillated in the direction of the plate's thickness within the narrow groove of the horizontal arc welding, the arc is preferably directed towards the upper groove face while the electrode advances to the bottom of the groove, and the arc is preferably directed towards the lower groove face while the electrode advances to the groove surface. Besides the oscillation patterns shown in FIG. 2(a) to FIG. 2(f), the other oscillation patterns may optionally be adopted in accordance with the present invention.

Figure 3A:
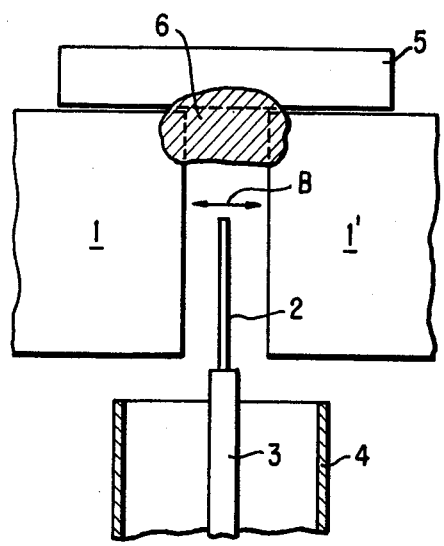
FIG. 3 is a transverse cross-section of the vertical arc welding according to the present invention.
FIG. 3(b) is a longitudinal cross-section of the vertical arc welding according to the present invention.
Figure 3B:
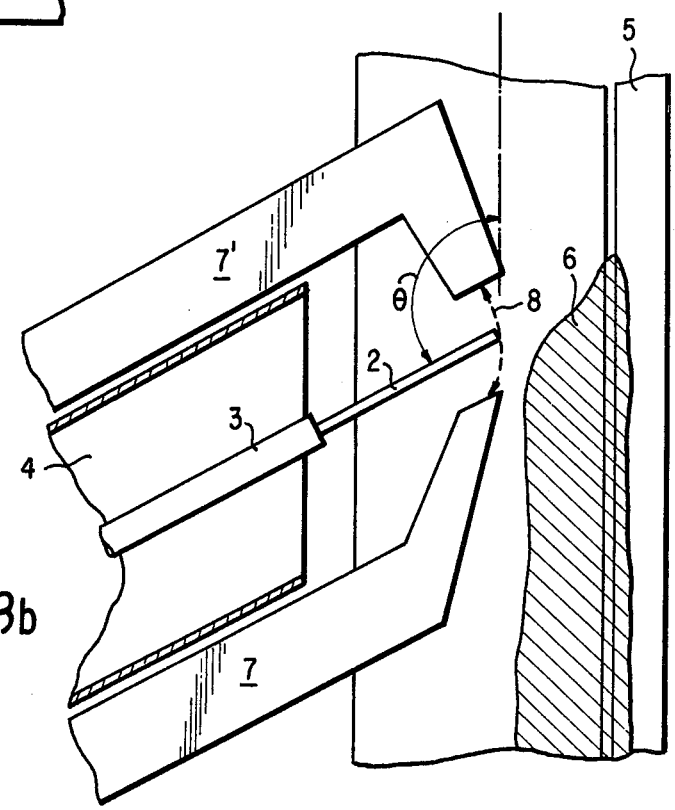

FIG. 3(a) and FIG. 3(b) show the vertical arc welding arrangement according to the present invention. A narrow gap is provided between thick plates 1 and 1' to be welded. A welding electrode 2 is fed through welding current fed tip 3. The welding zone is gas shielded by shielding gas fed through shielding nozzle 4. A backing material 5 is placed at the back side of the narrow groove. The electrode 2 is oscillated with a reciprocating movement in the direction of the groove's width along the locus B. A pair of magnetic heads 7 and 7' are provided on both sides of the electrode so as to generate a magnetic field 8 in the weld advancing direction. When the electrode 2 is in close proximity to the groove face of the plate 1, the arc is directed towards the groove face of the plate 1 by means of the magnetic force. On the other hand, when the electrode is in close proximity to the groove face of the plate 1', the arc is directed towards the groove face of the plate 1' by means of the magnetic force. Thus, the direction of the welding arc is magnetically controlled in synchronism with the oscillation of the electrode. The electrode may be stopped or the travelling speed thereof may be changed during the oscillation of the electrode according to need.

The oscillation frequency of the electrode is preferably from 60–120 cycles per minute. If it is less than 60 cycles per minute, the penetration depth is shallow resulting in lack of fusion. While if it is over 120 cycles per minute, a stable welding arc cannot be maintained also resulting in lack of fusion. The angle defined between the electrode and the weld advancing direction, as shown in FIG. 3(b)', is preferably from 90° to 135°. If it is less than 90° molten metal falls down the welding zone in the case of vertical upward welding, and the arc strikes the bottom of the groove with sufficient strengh to burn through the groove such as in case of horizontal arc welding. While, if said angle is over 135°, the bottom portion of the groove is not penetrated enough in both the case of vertical upward arc welding and horizontal arc welding.

Next, the shielding gas will be described. In the case of horizontal arc welding, it is desirable to use a shielding gas consisting of an inert gas comprising more than 50% He. If this sheilding gas comprises less than 50% HE, deep penetration cannot be obtained. In the case of vertical up arc welding, it is desirable to adopt a shielding gas consisting of an inert gas comprising more than 50% Ar. If this shielding gas comprises less than 50% Ar, molten metal is apt to drop down the welding zone.

Figure 4A:
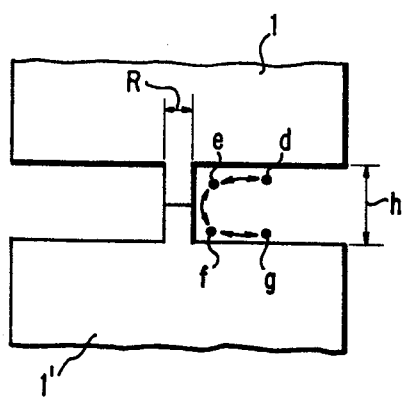
FIG. 4(a) shows the welding groove to which the horizontal arc welding according to the present invention is to be applied and the locus of the tip of the oscillated electrode.

FIG. 4(a) shows a preferred cross-sectional embodiment of the welding groove to be welded by horizontal arc welding. The thickness of the plates 1, 1', is 70 mm. The groove width $h$ is 10 mm. The root face R is 10 mm. The end of the electrode is oscillated along U-shaped oscillation pattern in a locus $d$—$e$—$f$—$g$—$f$—$e$—$d$, and at the same time, a magnetic force is applied in one direction to the welding arc when the electrode between "$d$" and "$e$" and in the opposite direction when the electrode is between "$f$" and "$g$". And when the electrode is between "$e$" and "$f$", no magnetic force is applied. Thus the welding arc is directed substantially perpendicular to the groove face when the electrode travels along the groove face, and the arc is directed to the bottom face of the groove when the electrode travels along the bottom face of the groove. Welding conditions are the same on both sides of the joint. Welding current is 320 A. Welding voltage is 28 V. Welding speed is 25 cm per minute. Shielding gas is 100% Ar. Welding wire is 5183 according to JIS, the diameter of which is 2.4 mm. Oscillation frequency of the electrode is 80 cycles per minute. But, the finishing welding was conducted without oscillating the electrode.

Figure 4B:
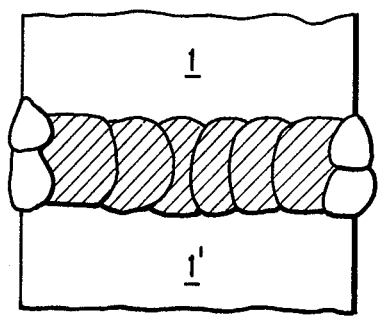
FIG. 4(b) shows macrostructure of the weld which is formed by the horizontal arc welding according to the present invention.

FIG. 4(b) shows in cross-section, the macrostructure of the welding bead formed by the above-mentioned welding. As a result, welding defects such as lack of fusion could not be observed, and good mechanical properties of the weld could be obtained.

The more preferable embodiments of the horizontal arc welding according to the present invention are hereinafter mentioned in detail.

EXAMPLE 1

Welding position; horizontal
Plates to be welded; aluminum alloy (JIS A5083) 50 mm thick.
Electrode wire; aluminum alloy (JIS A5183WY), 2.4mm in diameter.
Groove width; 8 mm
Shielding gas; 60% He + 40% Ar 80(liter/minute)
Welding current; 300 - 360 Amp
Welding voltage; 28 - 30 volts
Oscillation pattern; reciprocating movement is plate thickwise direction
Oscillation frequency; 80 cycles/minute
Arc oscillation frequency; 2 times/electrode oscillation cycle
Direction of welding arc; towards the upper groove face while the electrode advances to the bottom of the groove. towards the lower groove face while the electrode advances the groove surface.
Welding speed; 30 cm/minute
Welding pass; 6 passes
This horizontal arc welding was conducted according to FIG. 1(a) and FIG. 1(b). As a result, welding defects such as lack of fusion could not be observed. Good mechanical properties of the weld could be obtained.

EXAMPLE 2

Welding position: vertical
Plates to be welded; aluminum alloy (JIS A5083) 50 mm thick
Electrode wire; aluminum alloy (JIS A5183WY), 2.4 mm in diameter
Groove; I groove, 12 mm in groove width
Shielding gas; 70% Ar + 30% He, 80 liter/minute
Welding current; 320 - 360 Amp
Welding voltage; 28 - 31 Volts
Welding speed; 20 cm/minute
Oscillation pattern: reciptocating movement in the groove widthwise direction
Oscillation frequency; 90 cycles/minute
Arc oscillation frequency; 2 times/electrode oscillation cycle
Welding pass; 6 passes
This vertical upward arc welding was conducted according to FIG. 3(a) and FIG. 3(b). As a result, welding defects such as lack of fusion could not be observed. Good mechanical properties of the weld could be obtained.

Figure 5:
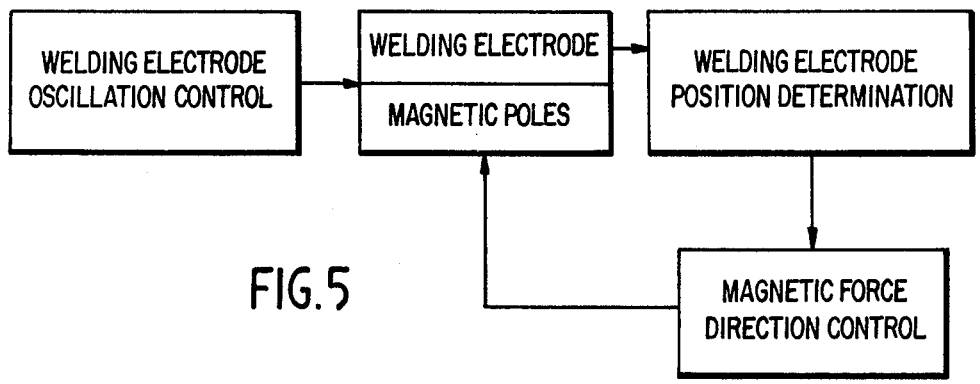
FIG. 5 is a control block diagram of the apparatus according to the present invention.

FIG. 5 shows the control block diagram of the welding apparatus for carrying out the method of the invention. "Welding electrode" and "magnetic poles" are mechanically oscillated by means of "welding electrode oscillation control". The position of the welding electrode is detected by "welding electrode position determination". The out put signal from "welding electrode position determination" is applied to "magnetic force direction control", so that the arc is properly directed to the desired position of the groove.

Figure 6:
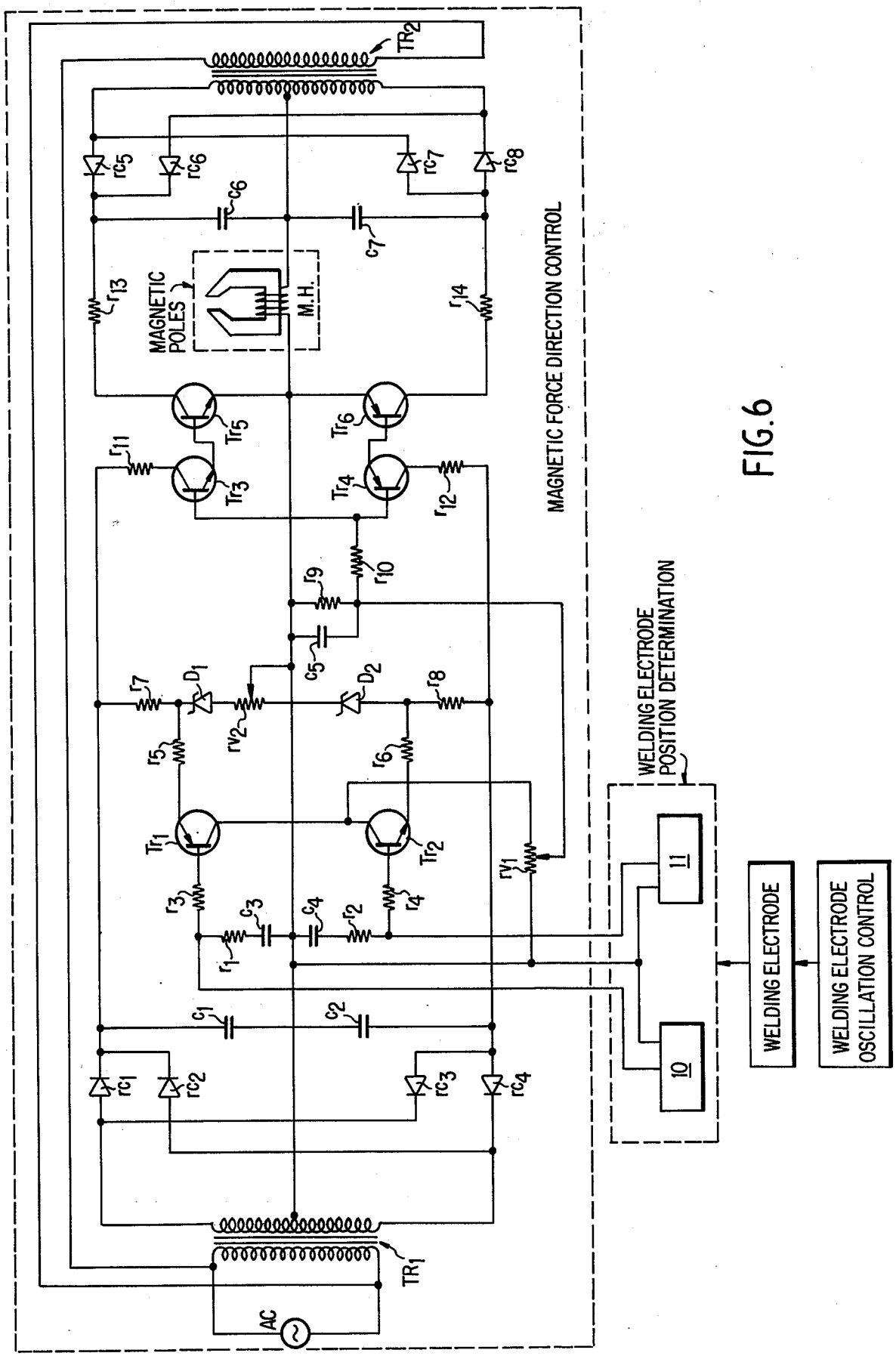
FIG. 6 is an electric circuit of the magnetic force direction control according to the apparatus of the present invention.

FIG. 6 shows the electric circuit of the magnetic force direction control according to the apparatus of the present invention. The voltage of alternating current source A.C. is changed by transformer $TR_1$ and then rectified by diodes $rc_1$, $rc_2$, $rc_3$ and $rc_4$ so that positive and negative direct currents having the same zero level. For example, in case of vertical upward arc welding, when an order that the welding arc should be directed towards the left groove face is given to the left groove face directing signal 10, the output from 10 is short-circuited, and transistors $Tr_5$, and $Tr_3$ are made conductive. The voltage of alternating current source A.C. is also changed by transformer $TR_2$ so that the positive and negative direct currents having the same zero level may be provided by diodes $rc_5$, $rc_6$, $rc_7$ and $rc_8$. As mentioned above, transistor $Tr_3$ is conductive, and power transistor $Tr_5$ is also made to be conductive, thus energizing the coil of the magnetic poles (heads) to direct the welding arc towards the left side of the groove face.

On the other hand, when an order that the welding arc should be directed towards the right groove face is given to the right groove face detecting signal 11, the output from 11 is short-circuited, and then transistors $Tr_2$ and $Tr_4$ are both made conductive. As a result power transistor $Tr_6$ is also made conductive to energize the coil of the magnetic poles to direct the arc towards the right side of the groove face. The strength of the magnetic force can be changed by adjusting either transformer $TR_2$ or variable resistor $rv_1$. $C_1$, $C_2$, $C_3$, $C_4$, $C_5$, $C_6$, and $C_7$ are capacitors, while $r_1$, $r_2$, $r_3$, $r_4$, $r_5$, $r_6$, $r_7$, $r_8$, $r_9$, $r_{10}$, $r_{11}$, $r_{12}$, $r_{13}$ and $r_{14}$ are resistors, while $D_1$ and $D_2$ are diodes. $rv_1$ and $rv_2$ are variable resistors. M.H. represents magnetic heads. This FIG. 6 is shown in accordance with the block diagram of FIG. 5.

Obviously, numerous additional modifications and variations of the present invention are possible in light of the above teachings. It is therefore to be understood that within the scope of the appended claims, the invention may be practiced otherwise then as specifically described herein.

What is claimed as new and desired to be secured by Letters Patent of the United States is:

1. An arc welding process comprising the steps of:
   preparing a welding groove between plates forming a welding line;
   generating a welding arc between a welding electrode and the plates to be welded;
   oscillating the welding electrode;
   generating a magnetic force;
   oscillating the direction of the welding arc by the magnetic force in synchronism with the oscillating of the welding electrode;
   whereby the welding arc is directed to the groove face of each plate to be welded.

2. The arc welding process recited in claim 1 wherein the electrode oscillating step comprises:
   oscillating the welding electrode substantially within a plane intersecting the welding line.

3. The arc welding process recited in claim 1 including the step of:
   maintaining the angle defined between the electrode and the weld advancing direction from 90° to 135°.

4. The arc welding process recited in claim 1 wherein the electrode oscillating step comprises:
   oscillating the welding electrode along a triangular oscillation pattern.

5. The arc welding process recited in claim 1 wherein the electrode oscillating step comprises:
   oscillating the welding electrode along a rectangular oscillation pattern.

6. The arc welding process recited in claim 1 wherein the electrode oscillating step comprises:

oscillating the welding electrode along a reciprocating oscillation pattern in the plate thickness direction.

7. The arc welding process recited in Claim 1 wherein the electrode oscillating step comprises:
oscillating the welding electrode along a reciprocating oscillation pattern in the groove width-wise direction.

8. The arc welding process recited in claim 1 wherein the electrode oscillating step comprises:
oscillating the welding electrode along a "U" shaped oscillation pattern.

9. The arc welding process recited in claim 1 wherein the electrode oscillating step comprises:
oscillating the welding electrode along a reciprocating oscillation pattern along the welding line.

10. The arc welding process recited in claim 1 wherein the preparing step comprises:
preparing a welding groove having a gap less than 20 mm. between plates forming a welding line.

11. The arc welding process recited in claim 1 wherein the preparing step comprises:
preparing a welding groove having a groove angle of less than 40° between plates forming a welding line.

12. The arc welding process recited in claim 1 wherein the preparing step comprises:
preparing a welding groove between aluminum plates forming a welding line.

13. The arc welding process recited in claim 1 wherein the preparing step comprises:
preparing a welding groove between aluminum alloy plates forming a welding line.

14. The arc welding process recited in claim 1 wherein the preparing step comprises:
preparing a welding groove between plates disposed vertically and forming a horizontal welding line; and including the step of shielding the welding zone with an inert gas comprising more than 50% helium.

15. The arc welding process recited in claim 1 wherein the preparing step comprises:
preparing a welding groove between plates disposed vertically and forming a vertical welding line; and including the step of shielding the welding zone with an inert gas comprising more than 50% argon.

16. An arc welding process comprising the steps of:
preparing a welding groove having a gap of less than 20 mm. between plates disposed vertically and forming a horizontal welding line;
generating a welding arc between a welding electrode and the plates to be welded;
shielding the welding zone with an inert gas comprising more than 50% helium;
oscillating the consummable welding electrode in a reciprocating oscillation pattern in the plate thickwise direction with an amplitude of less than 15 mm. and an oscillation frequency between 60 and 120 cycles per minute;
directing the welding arc towards the upper groove face while the electrode advances towards the bottom of the groove;
directing the electrode towards the lower groove face while the electrode advances towards the groove's surface;
maintaining the angle defined between the electrode and the weld advancing direction from 90° to 135°;
generating a magnetic force;
oscillating the direction of the welding arc by a magnetic force in synchronism with the oscillating of the welding electrode;
whereby the welding arc is directed to the groove face of each plate to be welded.

17. An arc welding process comprising the steps of:
preparing a welding groove having a gap of less than 20 mm. between plates disposed vertically and forming a vertical welding line;
generating a welding arc between a welding electrode and the plates to be welded;
shielding the welding zone with an inert gas comprising more than 50% argon;
oscillating a consumable electrode in a reciprocating oscillation pattern in the groove widthwise direction with an oscillation frequency of between 60 and 120 cycles per minute.
generating a magnetic force;
oscillating the directio of the welding arc by the magnetic force in synchronism with the oscillating of the welding electrode so that the welding arc is directed to the groove face of each plate to be welded; and maintaining the angle defined between the electrode and the weld advancing direction from 90° to 135°;
whereby the groove faces can be sufficiently and steadily penetrated.

18. An arc welding apparatus comprising:
means for generating a welding arc between a welding electrode and plates having a welding groove therebetween forming a welding line;
means for oscillating the welding electrode;
means for generating a magnetic force to direct the welding arc towards a desired position within the groove; and
means for oscillating the magnetic force in synchronism with the oscillation of the electrode.

* * * * *